United States Patent
Caruel

(10) Patent No.: US 12,545,411 B2
(45) Date of Patent: Feb. 10, 2026

(54) SYSTEM FOR COOLING A REFRIGERANT FOR AN AIRCRAFT COMPRISING A SAFETY HEATING DEVICE AND METHOD FOR USING SUCH A SYSTEM

(71) Applicant: Safran Nacelles, Gonfreville-l'Orcher (FR)

(72) Inventor: Pierre Charles Caruel, Moissy-Cramayel (FR)

(73) Assignee: Safran Nacelles, Gonfreville-l'Orcher (FR)

( * ) Notice: Subject to any disclaimer, the term of this patent is extended or adjusted under 35 U.S.C. 154(b) by 106 days.

(21) Appl. No.: 18/686,031

(22) PCT Filed: Aug. 18, 2022

(86) PCT No.: PCT/EP2022/073122
§ 371 (c)(1),
(2) Date: Feb. 23, 2024

(87) PCT Pub. No.: WO2023/025664
PCT Pub. Date: Mar. 2, 2023

(65) Prior Publication Data
US 2024/0409222 A1   Dec. 12, 2024

(30) Foreign Application Priority Data

Aug. 26, 2021   (FR) ..................................... 2108950

(51) Int. Cl.
*B64D 13/08* (2006.01)
*F28D 1/03* (2006.01)
(Continued)

(52) U.S. Cl.
CPC .......... *B64D 13/08* (2013.01); *F05D 2250/25* (2013.01); *F28D 1/0308* (2013.01);
(Continued)

(58) Field of Classification Search
CPC ... B64D 13/08; F02C 7/14; F02C 7/16; F28D 1/0308; F28D 1/0358; F28D 9/0031; F28D 2021/0026; F28F 3/12; F05D 2260/213
See application file for complete search history.

(56) References Cited

U.S. PATENT DOCUMENTS

| 3,080,716 A * | 3/1963 | Cummings ............... F02C 7/14 60/39.83 |
| 2019/0217965 A1 | 7/2019 | Turney |
| 2020/0318546 A1 | 10/2020 | Peyron |

FOREIGN PATENT DOCUMENTS

EP    0019492 B1    4/1986

OTHER PUBLICATIONS

International Search Report and Written Opinion for International Patent Application No. PCT/EP2022/073122 (dated Nov. 30, 2022).

* cited by examiner

*Primary Examiner* — Joseph F Trpisovsky
(74) *Attorney, Agent, or Firm* — Alumen IP Law PC

(57) ABSTRACT

A system (1) for cooling a refrigerant (R) for an aircraft comprising a plurality of ducts (2) for circulating the refrigerant (R) that are configured to be at least partially in contact with an airflow (A) so as to cool the refrigerant (R) through convection, the cooling system (1) comprising a safety heating device (3) extending internally inside at least one portion of the circulation ducts (2) so as to heat the refrigerant (R), a member (4) for measuring a physical parameter of the refrigerant (R) according to the flow rate of the refrigerant (R) in the circulation ducts (2) and a control member (5) configured to activate the safety heating device (3) when the measured physical parameter is below a predetermined threshold corresponding to a minimum flow rate of the refrigerant (R) in the circulation ducts (2).

14 Claims, 5 Drawing Sheets

(51) Int. Cl.
*F28D 9/00* (2006.01)
*F28D 21/00* (2006.01)
*F28F 3/12* (2006.01)

(52) U.S. Cl.
CPC .......... *F28D 1/0358* (2013.01); *F28D 9/0031* (2013.01); *F28D 2021/0026* (2013.01); *F28F 3/12* (2013.01)

SYSTEM FOR COOLING A REFRIGERANT FOR AN AIRCRAFT COMPRISING A SAFETY HEATING DEVICE AND METHOD FOR USING SUCH A SYSTEM

TECHNICAL FIELD

The present invention relates to the field of heat exchangers and relates more precisely to a system for cooling a refrigerant for an aircraft.

In a known manner, an aircraft comprises one or more propulsion assemblies comprising a turbomachine and a nacelle. The turbomachine is configured to allow the aircraft to be propelled from the acceleration of an internal airflow circulating in a secondary duct of the turbomachine and coming from an external airflow. The nacelle extends around the turbomachine and allows the external airflow to be guided into the turbomachine.

In a known manner, the turbomachine comprises a set of rotating members, such as a fan, one or more compressors, one or more turbines, an accessory gearbox, one or more accessory electric generators (not shown), etc. To ensure the cooling and lubrication of the rotating devices (hot zones), it is known that a refrigerant, usually oil, is circulated in contact with the rotating portions in a closed circuit in order to take heat and cool them. To ensure cooling of the refrigerant, the aircraft is known to comprise one or more heat exchangers to take the heat from the refrigerant.

It is known by patent application FR3094753A1 a surface-type heat exchanger which extends at the nacelle surface in order to cool the refrigerant, forming the hot source, by convection with an airflow, forming the cold source. Thus, the circulation of the airflow allows heat to be taken from the refrigerant that comes from the hot zones of the turbomachine. The airflow is in the form of the airflow outside the turbomachine, if the surface heat exchanger is mounted on the outer surface of the nacelle, and in the form of an internal airflow circulating in the secondary duct of the turbomachine if the surface heat exchanger is mounted on the inner surface of the nacelle. Once cooled by the airflow, the refrigerant is brought back into contact with the hot zones to extract heat from the hot zones again. The surface heat exchanger comprises a set of ducts, traditionally parallel, wherein the refrigerant circulates in order to facilitate convective exchanges with the airflow.

In practice, the refrigerant may freeze in the ducts, especially when exposed to very low outdoor temperatures for a long time and/or when the refrigerant flow rate is too low. Such conditions may be encountered when the engine of the turbomachine is stopped in flight or when the aircraft is parked on the ground for a prolonged period in very cold weather. Such conditions slow down or even prevent the circulation of refrigerant through the ducts, which undesirably disrupts the cooling of the hot zones of the turbomachine after starting or restarting the engine.

To counteract this, it is known that finned heat exchangers have a diversion duct, extending peripherally around all refrigerant ducts. In the event of freezing, the refrigerant circulates through the diversion duct in order to heat the frozen ducts by conduction. However, finned heat exchangers have the disadvantage of disrupting the flow of the external airflow, which undesirably reduces the performance of the turbomachine. Indeed, the fins form irregularities on the surface of the nacelle, which promote heat exchange and allow the ducts to be arranged in a compact manner, but have the disadvantage of undesirably reducing the aerodynamic performance of the nacelle.

To solve this disadvantage, an immediate solution would be to provide a peripheral diversion channel on a surface heat exchanger with a smooth and aerodynamic outer skin. However, such a solution does not effectively heat all the ducts, which are further apart than in a finned heat exchanger. It would thus be necessary to mount an auxiliary duct next to each that, which is costly and cumbersome. In addition, to be effective, it would be necessary to use a heat transfer fluid with a low viscosity range, which has the disadvantage of being expensive, with a high density and requiring a dedicated closed circuit on board the aircraft.

Thus, the invention aims to eliminate at least some of these drawbacks.

DESCRIPTION OF THE INVENTION

The invention relates to a system for cooling a refrigerant for an aircraft, the cooling system comprising a plurality of ducts for circulating the refrigerant, the circulation ducts being configured to be at least partially in contact with an airflow so as to cool the refrigerant by convection.

The invention is remarkable in that the cooling system comprises:
- at least one safety heating device extending internally inside at least one portion of said circulation ducts so as to directly heat the refrigerant,
- at least one member for measuring a physical parameter of the refrigerant, which is according to the flow rate of the refrigerant in the circulation ducts, and
- at least one control member configured to activate the safety heating device when the measured physical parameter is below a predetermined threshold corresponding to a minimum flow rate of the refrigerant in the circulation ducts.

The invention advantageously makes it possible to promote the circulation of the refrigerant in the cooling system when its temperature is low, by heating it thanks to the safety heating device. The safety heating device advantageously extends internally in the circulation ducts, in direct contact with the refrigerant, which promotes heat exchanges with the refrigerant. The refrigerant is thus heated quickly and conveniently by the cooling system itself. This avoids having to integrate an external heating device into the loaded environment of the aircraft, which is less efficient because it is not in direct contact with the refrigerant. Such a safety heating device prevents the blockage of one or more circulation ducts and thus restores the operation of the heat exchanger after starting or restarting the turbomachine.

The invention thus proposes adding a second heating safety function to the cooling system, wherein the refrigerant, i.e. the cold source, is heated by the safety heating device, i.e. the hot source. This is in contrast to the main function of the cooling system, which is to cool the refrigerant, i.e. the hot source, thanks to the airflow, i.e. the cold source. The invention thus makes it possible to prevent the refrigerant from freezing or even solidifying in the circulation ducts, in particular following prolonged exposure to low temperatures or in the absence of hot refrigerant supply. Such situations occur when the aircraft engine is stopped in flight or when the aircraft is parked on the ground for a prolonged period of time in cold weather.

According to a preferred aspect of the invention, the physical parameter is chosen from a set comprising the temperature, speed, flow rate, viscosity, and pressure of the refrigerant in the circulation ducts. Preferably, the measured physical parameter is the temperature of the refrigerant and the threshold has the form of a threshold temperature.

According to one aspect of the invention, the safety heating device extends internally in at least one third of the circulation ducts, preferably in at least half of the circulation ducts, preferably in all of the circulation ducts. The safety heating system thus allows the refrigerant to be heated efficiently and globally. The safety heating device in particular comprises an extended exchange surface in direct contact with the refrigerant, which promotes heat exchange, in particular by conduction.

Preferably, the cooling system comprises at least one distributor configured to supply the circulation ducts with refrigerant, the safety heating device extending into at least one portion of the distributor. The safety heating device thus makes it possible to heat the circulation ducts but also the supply distributor to prevent the clogging of the latter.

Preferably, the cooling system comprises at least one manifold configured to collect the refrigerant at the outlet of the circulation ducts, the safety heating device extending into at least one portion of the manifold. The safety heating device thus makes it possible to heat the circulation ducts, but also the outlet manifold of the circulation ducts to prevent clogging of the latter.

According to a preferred aspect of the invention, the safety heating device comprises a surface cross-section at least twice less than the surface of a cross-section of at least one circulation duct, preferably at least three times less than the surface of a cross-section of at least one circulation duct. This makes it possible to maintain optimum circulation of the refrigerant while limiting the diameter of the circulation ducts. Preferably, the safety heating device comprises a surface cross-section at most five times bless than the surface of a cross-section of at least one circulation duct. The exchange surface of the safety heating device with the refrigerant is thus extended, which promotes heat exchange.

According to one aspect of the invention, at least one portion of the circulation ducts comprises a wall comprising an inner face on which the safety heating device is attached, preferably in a plurality of discontinuous attachment points to each other. The safety heating device is thus integral with the circulation ducts, which presents any relative movement, causing shocks and vibrations during the flight of the aircraft. Discontinuous attachment points further increase the resistance of the cooling system to thermal expansion, providing a certain clearance that allows a difference in thermal expansion between the circulation ducts and the safety heating device.

According to one aspect of the invention, at least one portion of the circulation ducts comprises a wall comprising an exchange portion in contact with the airflow and a portion opposite the exchange portion that is isolated from the airflow, the safety heating device being attached to the opposite portion. This avoids reducing the heat exchanges between the airflow and the refrigerant that occur at the exchange portion. In addition, mounting the safety heating device on the opposite side prevents heat from being dissipated into the airflow.

According to one aspect of the invention, at least one portion of the safety heating device extends in a wavy manner within at least one circulation duct, preferably. This makes it possible to promote the resistance of the cooling system to a difference in thermal expansion between the circulation ducts and the safety heating device.

According to one aspect of the invention, the cooling system comprises an outer skin, in contact with the airflow, and an inner skin, isolated from the airflow, defining together the circulation ducts, the outer skin being preferably smooth so as to be aerodynamic for the airflow. The cooling system thus has the form of a surface heat exchanger, as opposed to a finned heat exchanger wherein the outer skin comprises ridges to increase the exchange surface between the airflow and the refrigerant. The cooling system advantageously facilitates the flow of the airflow, which increases the performance of the aircraft.

Preferably, the inner skin is wavy so as to define the circulation ducts. The circulation ducts thus comprise a half-circle cross-section to promote the aerodynamics of the outer skin.

Preferably, the refrigerant is in the form of oil, configured to ensure cooling of the rotating portions of an aircraft propulsion assembly.

Preferably, the threshold temperature is below −20° C., preferably below −30° C., preferably below −40° C. The refrigerant is frozen or even solidified at the threshold temperature, which reduces or even prevents the circulation thereof in the circulation ducts.

Preferably, the safety heating device is configured to heat above 50° C., preferably above 80° C. This allows the refrigerant to be heated quickly and efficiently.

According to one aspect of the invention, the safety heating device comprises at least one heating line wherein a heat transfer fluid circulates, the heat transfer fluid being preferably air. This advantageously allows the heat transfer fluid to be taken from the airflow, preferably at the compressor or between the high-pressure and low-pressure turbines, where it is naturally hot, which avoids having to heat the air.

Preferably, the safety heating device comprises a single heating line. This avoids a heavy load on the cooling system and simplifies the structure of the safety heating system.

According to one aspect of the invention, the heat transfer fluid is air comprising in part the exhaust gasses of the turbomachine.

Preferably, the safety heating device comprises at least one supply member of the line with heat transfer fluid, preferably according to a flow rate corresponding to a Reynolds number greater than 2,500, preferably greater than 4,000. The flow of the heat transfer fluid is thus turbulent, which promotes heat exchanges with the refrigerant.

Preferably, the safety heating device comprises at least one reflux member of the heat transfer fluid in the airflow, preferably in the external airflow. This avoids the need for a closed circuit and having to heat the heat transfer fluid.

According to one aspect of the invention, the safety heating device comprises at least one resistive electrical cable. This advantageously requires no heat transfer fluid circuit. Temperature adjustment is also simplified.

Preferably, the safety heating device comprises a single resistive electrical cable. This avoids a heavy load on the cooling system and simplifies the structure of the safety heating system.

Preferably, the measuring member is in the form of a temperature sensor, preferably mounted in a circulation duct to be accurate and reliable.

According to a preferred aspect, the safety heating device comprises a self-regulating conductive material, the thermal conductivity of which decreases with the temperature. This makes it possible to increase the heat exchange when the refrigerant temperature is low and reduces the heat exchange when it increases.

The invention also relates to an aircraft comprising at least one propulsion assembly configured to provide its propulsion and comprising at least one system for cooling a refrigerant such as described previously, the refrigerant preferably configured to cool at least one rotating member of the propulsion assembly. Preferably, the propulsion assembly comprises a turbomachine.

Thanks to the invention, the circulation of the refrigerant in the aircraft is kept fluid even in the event of a flight stop or prolonged parking on the ground in very cold weather in particular. This makes it possible to maintain a minimum flow rate of refrigerant circulating in the aircraft, in particular to cool the rotating portions of the rotating members of the aircraft propulsion assemblies.

Preferably, the aircraft comprises a nacelle comprising a fairing and the outer skin of the cooling system forms a portion of the fairing. Preferably, the outer skin is smooth and aerodynamic to promote the flow of the airflow. The cooling system is thus free of fins.

According to a preferred aspect, the cooling system extends at the outer surface of the nacelle so as to be in contact with the airflow outside the turbomachine.

According to a preferred aspect, the cooling system extends at the inner surface of the nacelle so as to be in contact with the inner airflow circulating in the secondary duct of the turbomachine.

Preferably, the cooling system comprises at least one air taking member for supplying the lines of the safety heating device, which extends into the primary duct of the aircraft, preferably at the compressor or between the high-pressure and low-pressure turbines.

Preferably, the measurement member of the physical parameter is in the form of a temperature sensor, preferably mounted between the high-pressure turbine and the low-pressure turbine of the turbomachine and configured to measure the exhaust gas temperature of the turbomachine, known to those skilled in the art under the term "EGT (Exhaust Gas Temperature) sensor".

The invention also relates to a method of using a cooling system such as described previously, the method of using comprising:

A step of measuring a physical parameter of the refrigerant, which is according to the flow rate of the refrigerant in the circulation ducts and When the measured physical parameter is less than a predetermined threshold corresponding to a minimum flow rate of the refrigerant in the circulation ducts, a step of activating the safety heating device, so as to heat the refrigerant.

The method of use is advantageously simple and fast to implement. The heating is advantageously only activated when the refrigerant is frozen or even solidified, which is controlled via the physical parameter. This therefore does not disrupt the heat exchange between the airflow and the refrigerant. In addition, this eliminates the need to install an external heat exchanger, which is bulky and inefficient. The safety heating device advantageously extends internally to the circulation ducts in direct contact with the refrigerant, for a fast, global and efficient action.

Preferably, the method of use comprises a step of deactivating the safety heating device, preferably when the measured physical parameter is greater than the threshold. The safety heating device thus forms a standby device, which is only activated when the refrigerant freezes or solidifies. This does not disturb the main cooling function of the cooling system.

Preferably, the method comprises an activation step when starting or restarting the aircraft propulsion assembly.

Preferably, an activation step and an inactivation step are implemented at each operating cycle of the aircraft propulsion assembly, in order to check the proper operation thereof and to limit the risk of clogging by a foreign body.

Preferably, the cooling system comprises a plurality of measuring members, of which at least one extends downstream of the safety heating device, in order to detect a leak therein, or continuous operation despite the inactivation step, which could be detrimental to flight safety.

The invention also relates to a method of using an aircraft such as described previously implementing the method of use such as described previously. Preferably, the method of use is implemented during a stop in flight of the engine.

The invention also relates to a method of manufacturing the cooling system manufacturing system such as described previously, comprising a step of attaching the safety heating device internally to the inner skin and a step of assembling the inner skin and the outer skin to form the circulation ducts. Preferably, the safety heating device is fixed in the housings formed by the waves of the inner skin. The manufacturing of the cooling system is advantageously simple, easy and fast.

DESCRIPTION OF THE FIGURES

The invention will be better understood upon reading the following description, given as an example, and referring to the following figures, given as non-limiting examples, wherein identical references are given to similar objects.

It should be noted that the figures set out the invention in detail in order to implement the invention, said figures may of course be used to better define the invention where applicable.

DETAILED DESCRIPTION OF THE INVENTION

The invention relates to a system for cooling a refrigerant for an aircraft which comprises a safety heating device to prevent the refrigerant from freezing or even solidifying when the refrigerant flow rate is low or in the event of prolonged exposure to very low temperatures. The invention is of particular interest when stopping the aircraft engine in flight, but also when parking on the ground for a prolonged period in very cold weather.

Figure 1:
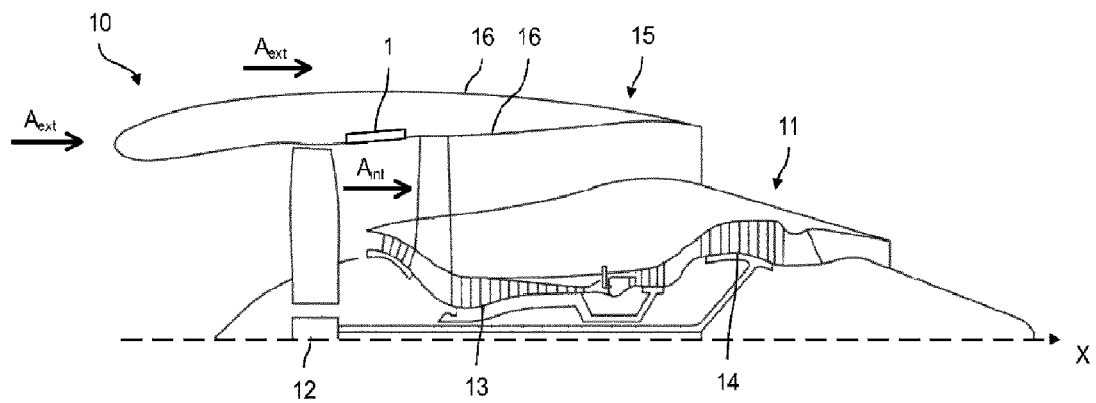
FIG. 1 is a longitudinal half-sectional schematic representation of an aircraft propulsion assembly comprising a cooling system according to an embodiment of the invention.

In reference to FIG. 1 and as described previously, an aircraft comprises one or more propulsion assemblies 10 comprising a turbomachine 11 and a nacelle 15. The turbomachine 11 extends along a longitudinal axis X oriented from upstream to downstream and is configured to allow propulsion of the aircraft from the acceleration of an inner airflow $A_{int}$ circulating from upstream to downstream in the turbomachine and coming from an external airflow $A_{ext}$. The nacelle 15 extends around the turbomachine 11 along the longitudinal axis X and makes it possible to guide a portion of the external airflow $A_{ext}$ in the turbomachine 11.

As shown in FIG. 1 and described previously, the turbomachine 11 comprises a set of rotating members, such as a fan 12, one or more compressors 13, one or more turbines 14, an accessory gearbox (not shown), one or more accessory electrical generators (not shown), etc. In this for reference to FIGS. 1 and 2, to ensure the cooling and lubrication of the rotating members, the aircraft propulsion assembly 10 comprises a closed circuit 17 of refrigerant R, usually oil, which circulates in contact with the rotating portions of the rotating members (not shown). This allows the heat generated by the friction of the rotating portions to be transferred to the refrigerant R, in order to cool the rotating members. For the sake of clarity, the zones of the turbomachine 11 comprising rotating members to be cooled will be referred to as "hot zones".

Figure 2:
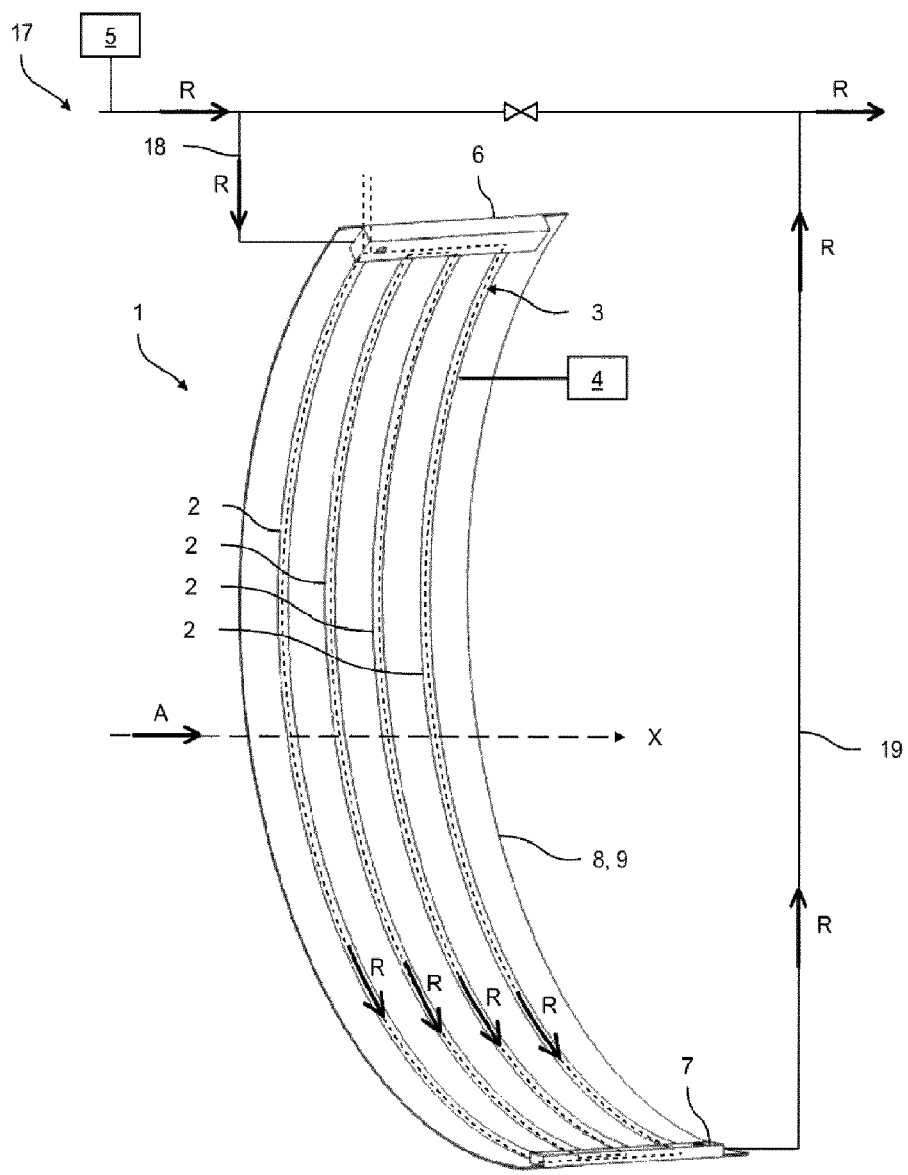
FIG. 2 is a schematic perspective representation of the cooling system according to an embodiment of the invention.

As shown in FIGS. 1 and 2, the closed circuit 17 comprises a system for cooling 1 the refrigerant fluid R which comprises an inlet line 18, wherein refrigerant fluid R to be cooled circulates, and an outlet line 19, wherein cooled refrigerant R flows. The cooling system 1 comprises a set of circulation ducts 2 of the refrigerant R, configured to be in contact with an airflow A ([FIG. 2]) so as to cool the refrigerant R which has accumulated heat after circulating in contact with the hot zones. In reference to FIG. 2, the cooling system 1 also comprises a distributor 6 and a manifold 7 configured respectively to distribute and collect the refrigerant R in the circulation ducts 2.

Figure 3:
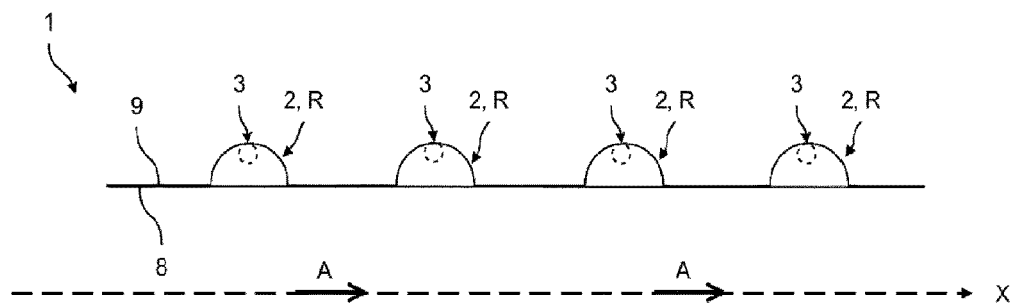
FIG. 3 is a schematic cross-section representation of the cooling system of [FIG. 2].

In reference to FIGS. 2 and 3, the cooling system 1 comprises an outer skin 8 and an inner skin 9 attached together, by welding or gluing by way of examples, which together define the circulation ducts 2. According to a preferred aspect shown in [FIG. 3], the outer skin 8 is smooth so as to be aerodynamic and promote the circulation of the airflow A. The outer skin 8 is configured to be in direct contact with the airflow A.

The inner skin 9 comprises concavities defining the circulation ducts 2. Preferably, the circulation ducts 2 comprise a half-ellipse-shaped, preferably half-circle-shaped cross-section that maximizes the exchange surface with the airflow An as shown in FIG. 3. The cooling system 1 is preferably free of fins forming asperities at the outer skin 8 that disrupt the flow of the airflow A. Preferably, the outer skin 8 and the inner skin 9 are rigid and made from an aluminum alloy, preferably with a thickness of between 0.8 mm and 2 mm.

According to a preferred aspect shown in FIG. 1, the outer skin 8 forms a portion of the fairing 16 of the nacelle 15. In other words, the cooling system 1 is in the form of a surface heat exchanger mounted on the surface of the nacelle 15 so as to be in contact with the airflow A. In this example, the cooling system 1 is positioned downstream of the blower 12 on the inner side of the faring 16 facing the turbomachine 11, preferably upstream of the rectifier blades. The cooling system 1 is thus in contact with a substantial internal airflow $A_{int}$ coming from the fan is poor 12 and circulating in the secondary duct of the turbomachine 11. However, it goes without saying that the cooling system 1 could be positioned in any way on the surface of the nacelle 15, on the inner or outer face, at the fan cover, the thrust inverter (not shown), the secondary duct and the nozzle by way of examples. The cooling system 1 could in particular be positioned on the outer face of the fairing 16 opposite the inner face, so as to be in contact with the external airflow $A_{ext}$ to the turbomachine 11. In the following, airflow A refers indifferently to the internal airflow $A_{int}$ or the external airflow $A_{ext}$.

As shown in FIGS. 2 and 3, the circulation ducts 2 extend circumferentially around the longitudinal axis X in an angular portion of the nacelle 15. The circulation ducts 2 thus extend in an axial section relative to the longitudinal axis X parallel to each other. Each circulation duct 2 thus extends in a plain transversal to the longitudinal axis X, positioned upstream or downstream of the transverse planes of the other circulation ducts 2. In this example, there are four circulation ducts 2, but it goes without saying that this number could be different. Preferably, the total length of the circulation ducts 2 is greater than 1 m, preferably greater than 2 m, and preferably less than 4 m. Preferably also, the circulation ducts 2 comprise a surface cross-section greater than 0.3 cm$^2$ and less than 2 cm$^2$. Preferably also, the longitudinal distance separating two adjacent circulation ducts 2 is greater than 3 cm and less than 5 cm. The circulation ducts 2 are thus spaced apart and comprise a substantial exchange surface to promote convective exchanges with the external airflow A.

According to the invention, as shown in FIGS. 2 and 3, the cooling system 1 further comprises a safety heating device 3 (shown as dotted lines), extending internally into the circulation ducts 2 so as to heat the refrigerant R. The cooling system 1 also comprises:

a member for measuring 4 a physical parameter $P_R$ of the refrigerant R, which is according to the flow rate of the refrigerant R in the circulation ducts 2, and a control member 5 configured to activate the safety heating device 3 when the measured physical parameter $P_R$ is less than a predetermined threshold corresponding to a predetermined minimum flow rate of the refrigerant R in the circulation ducts 2.

Preferably, the physical parameter $P_R$ is in the form of one of the following physical parameters: temperature, speed, flow rate, viscosity and pressure. The physical parameter $P_R$ thus has the form of a physical parameter the variation of which is linked to that of the flow rate in the circulation ducts 2. This makes it possible, by measuring a given parameter $P_R$, to determine whether the circulation of the refrigerant R is fluid in the circulation ducts 2 or whether it is necessary to activate the safety heating device 3.

According to a preferred aspect, the physical parameter $P_R$ has the form of the temperature of the refrigerant R. The predetermined threshold is preferably in the form of a temperature of less than −20° C., preferably less than −30° C., and preferably greater than −50° C. At such a threshold temperature, the oil, i.e. the refrigerant R, is frozen, or even solidified, which disrupts circulation thereof in the cooling system 1 and, consequently, the cooling of the hot zones. Activation of the safety heating device 3 allows the refrigerant R to be heated in order to reduce its viscosity and promote its circulation. The temperature of the refrigerant R at the inlet of the circulation ducts 2 is usually between 50° C. and 100° C. during the cruising speed of the aircraft. The temperature of the external airflow An is between −40° C. and −70° C. at a cruising altitude of 10,000 m. The threshold temperature may be reached in particular if the engine is stopped in flight or when parked on the ground for a prolonged period in very cold weather, namely if the temperature is below −40° C. for at least 15 minutes.

According to another preferred aspect, the physical parameter $P_R$ has the form of a local or average speed, flow rate or viscosity measured at one or more points of the circulation ducts 2. According to another preferred aspect, the physical parameter $P_R$ has the form of a pressure measured at one or more points of the circulation ducts 2, for example at the inlet and outlet of the circulation ducts 2 so as to determine a pressure difference. If the refrigerant freezes, the pressure difference rises above a predetermined threshold.

In reference to FIGS. 4A and 4B and as will be presented later, the safety heating device 3 preferably takes the form of one or more heating lines 30, 31, for example lines 30 of heat transfer fluid C (see [FIG. 4A]) or resistive electrical cables 31 (see [FIG. 4B]). The measuring member 4 is, for example, in the form of a temperature sensor, a flow meter, a speed sensor or a pressure sensor. Preferably, the measuring member 4 is mounted in the circulation ducts 2. The control member 5 is preferably in the form of at least one valve in the case of heat transfer fluid C line(s) 30 or an electrical switch in the case of resistive electrical cables 31. The control member 5 is mounted on the safety heating device 3, preferably at the inlet and/or outlet.

In reference to FIG. 3, the safety heating device 3, regardless of its shape, extends internally to the circulation ducts 2 in direct contact with the refrigerant R to promote exchanges by conduction. This prevents the formation of a solid portion in the circulation ducts 2.

The safety heating device 3 is also attached to the inner face 21 of the wall 20 of the circulation ducts 2, i.e. the inner skin 9, to prevent shocks and vibrations during flight of the aircraft that the outer skin 8 undergoes. According to a preferred aspect shown in FIGS. 3, 4A and 4B, the safety heating device 3 is attached on the opposite portion 24 to the exchange portion 23 with the external airflow A. In other words, the safety heating device 3 is attached to the inner skin 9 away from the external airflow A, preferably as far away as possible, so as not to disrupt the heat exchanges with the external airflow A. The safety heating device 3 is not in contact with the outer wall 8 in order to promote the heating of the refrigerant R and not to dissipate the heat in the external airflow A. Preferably, the safety heating device 3 is attached to the circulation ducts by a set of attachment points 22 (see FIGS. 4A and 4B) discontinuous from each other, in order to tolerate a difference in thermal expansion between the safety heating device 3 and the circulation ducts 2. Fastening is preferably achieved by welding or gluing.

In reference to FIG. 2, the safety heating device 3 extends over at least one third of the length of the circulation ducts 2, preferably over at least half, and preferably over the entire length of the circulation ducts 2 in the example of FIG. 2. In this example also, the safety heating device 3 extends into the distributor 6 and into the manifold 7. This allows global and efficient heating, avoiding any clogging. In reference to FIG. 3, the safety heating device 3, regardless of its shape, comprises a cross-section at least twice less, preferably at least three times less, and preferably at most five times less, than the cross-section of the circulation ducts 2. This ensures that the circulation of the refrigerant R is not disturbed while maximizing the exchange surface with the safety heating device 3. Preferably, the diameter of the safety heating device 3 is less than 4 mm and greater than 1 mm.

Figure 4A:
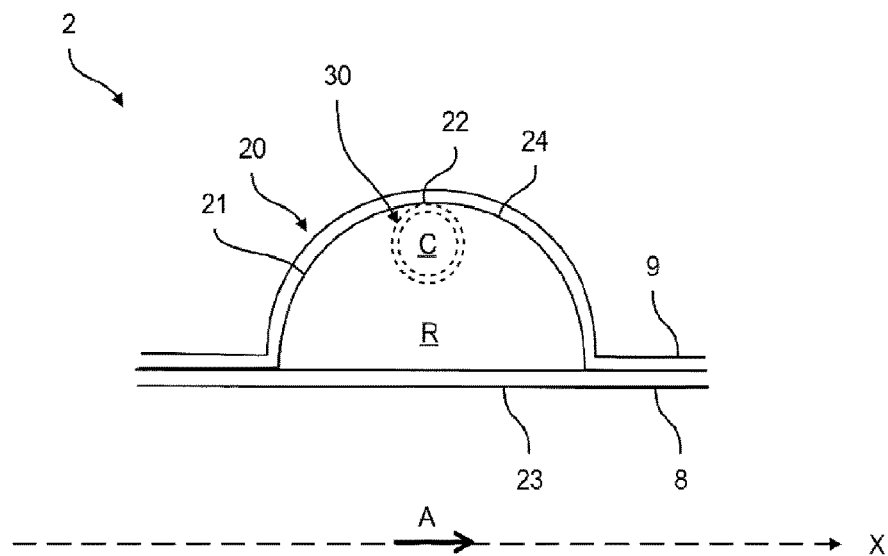
FIG. 4A is a schematic cross-section representation of a circulation duct of the cooling system with a safety heating device in the form of an internal heat transfer fluid line according to one embodiment of the invention.

In reference to FIG. 4A showing a safety heating device 3 comprising one or more line(s) 30 of heat transfer fluid C, the heat transfer fluid C is preferably in the form of air. The safety heating device 3 also comprises an air taking device, preferably at the compressor 13 (see [FIG. 1]), as well as an air discharge member in the external airflow A, preferably at the outside of the nacelle, for example at the drain pipes of the engine. Preferably, the temperature of the heat transfer fluid C is between 100° C. and 200° C. at the inlet. Such an open circuit advantageously avoids the need to provide a heat exchanger and a heating device. However, it goes without saying that another heat transfer fluid C could be used, in a closed circuit.

Still in the example of FIG. 4A, the line 30 preferably comprises a thermally conductive material, preferably stainless steel or aluminum, with a thickness of less than 1 mm to promote heat exchanges. Preferably also, the flow of the heat transfer fluid C in the line 30 is turbulent, preferably with a Reynolds number greater than 2,500.

Figure 4B:
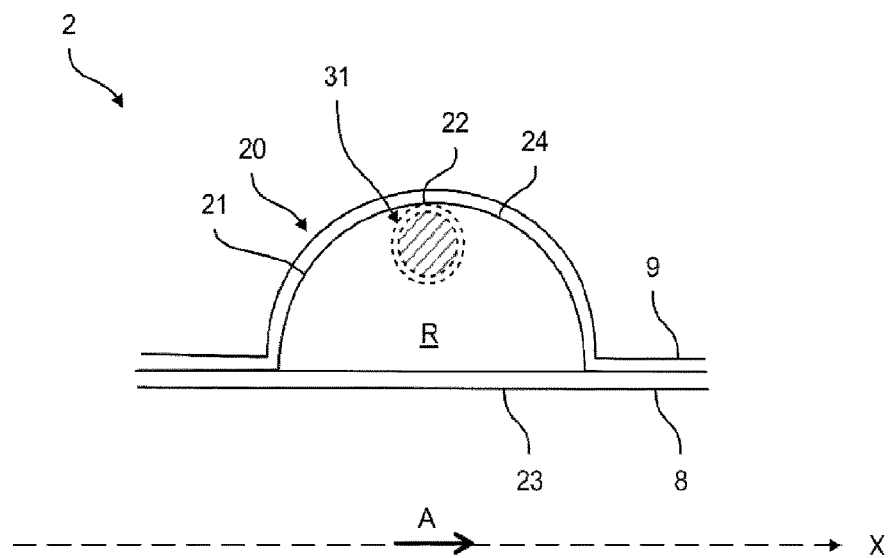
FIG. 4B is a schematic cross-section representation of a circulation duct of the cooling system with a safety heating device in the form of an internal resistive cable according to one embodiment of the invention.

In reference to FIG. 4B showing a safety heating device 3 comprising one or more resistive electrical cables 31, each cable 31 comprises a self-regulating conductive material, namely its electrical conductivity decreases with temperature. This allows the heating power to be automatically regulated according to the temperature of the refrigerant R. Preferably, the resistive electrical cable 31 comprises a resistance greater than 1.5 Ohm. The resistive electrical cable 31 is supplied by any electrical source of the aircraft, preferably an electrical generator of the propulsion assembly 10.

Figure 5A:
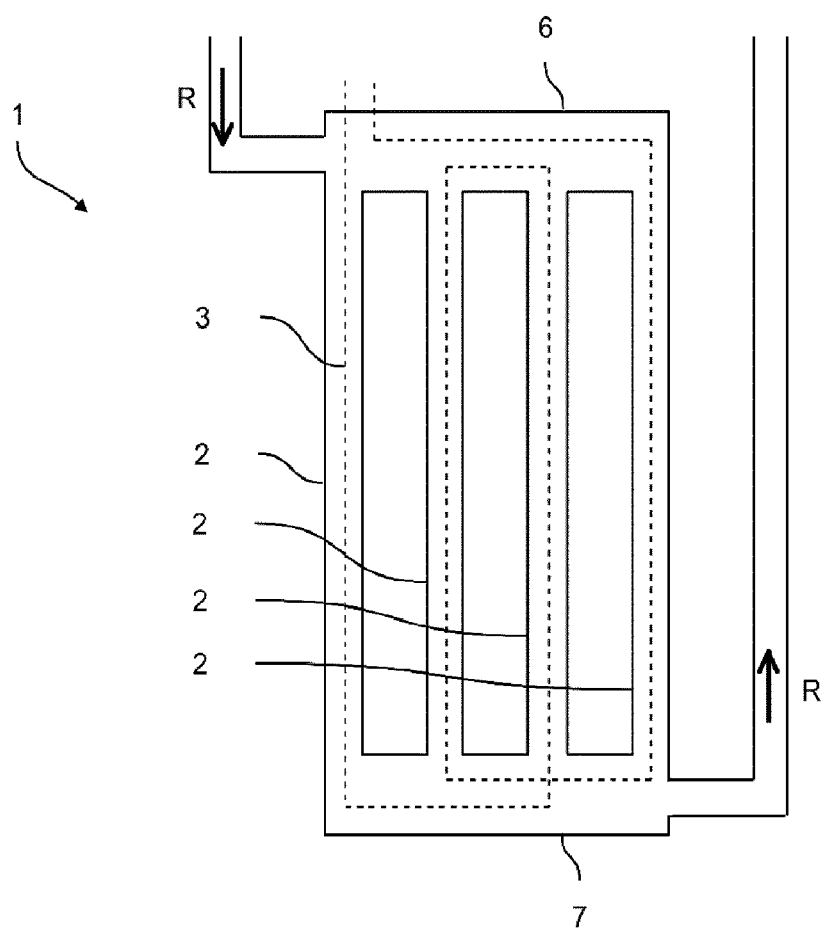
FIG. 5A and FIG. 5B are two simplified schematic representations of the positioning of the safety heating device in the circulation ducts of the cooling system according to two embodiments of the invention.
Figure 5B:
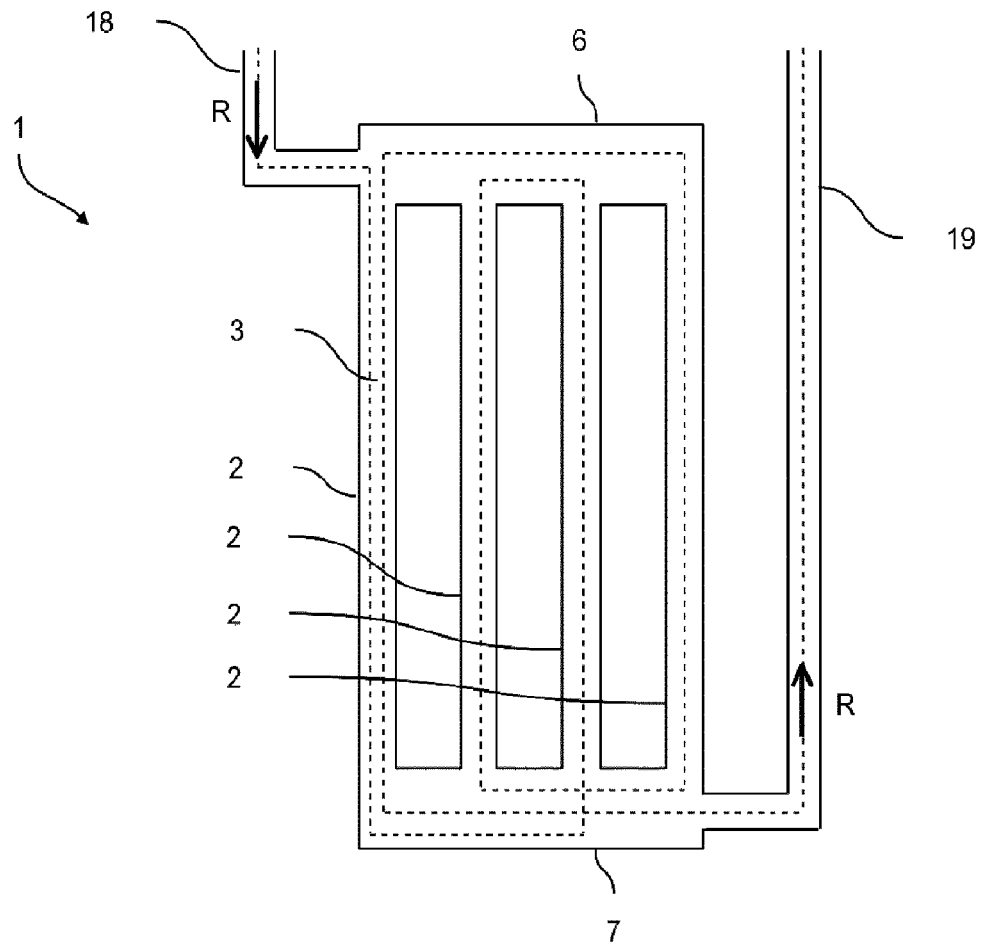

As shown in FIGS. 5A and 5B, the safety heating device 3 preferably has the form of a single line 30 or a single resistive cable 31 running through the circulation ducts 2 via the distributor 6 and the manifold 7. Preferably also, as shown in FIG. 5B, the safety heating device 3 extends into the inlet line 18 and the outlet line 19 of the cooling system 1.

Figure 6:
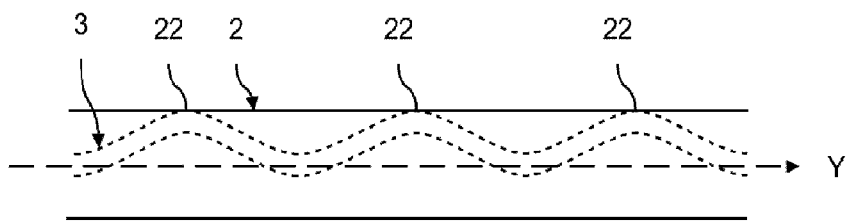
FIG. 6 is a schematic representation of the positioning of the safety heating device in the circulation ducts of the cooling system according to one embodiment of the invention.

According to a preferred aspect shown in FIG. 6, the safety heating device 3 extends in a wavy manner, preferably in a helical manner, into at least one portion of the circulation ducts 2. This makes it possible to limit the forces applied to the safety heating device 3, in the event of a difference in thermal expansion between the safety heating device 3 and the circulation ducts 2.

Figure 7:
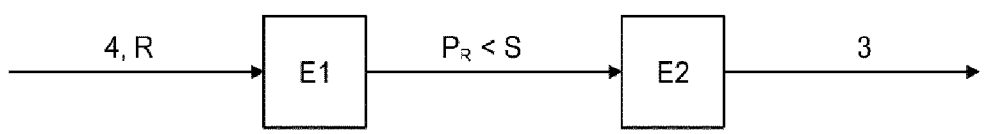
FIG. 7 is a schematic representation of the method for using the cooling system according to one embodiment of the invention.

In reference to FIG. 7, the invention also relates to a method for using the previously described cooling system 1, which comprises:

A step of measuring E1 the physical parameter $P_R$ and
When the physical parameter $P_R$ is less than the predetermined threshold S, a step of activating E2 the safety heating device 3, so as to heat the refrigerant R.

Figure 8:
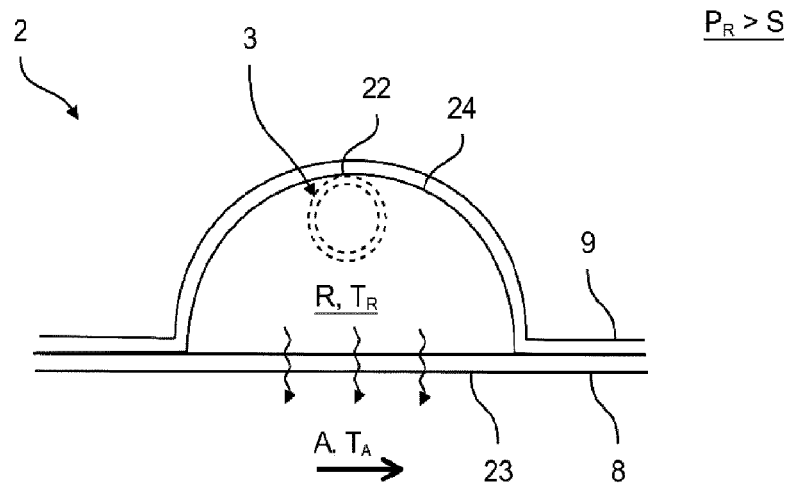
FIG. 8 is a schematic representation of the heat transfers in the cooling system when the safety heating device is deactivated.

The safety heating device 3 thus has the form of a standby device, which is activated only when required, in this case below the threshold S of the refrigerant R corresponding to a minimum flow rate of the latter in the circulation ducts 2 to cool the hot zones. As shown in FIG. 8, when the physical parameter $P_R$ is greater than the threshold S, the safety heating device 3 is inactive. In other words, the line 30 is not supplied with heat transfer fluid C or the resistive electrical cable 31 comprises a minimum resistance, preferably is not under voltage. The heat exchanges in the cooling system 1 are then limited to those between the refrigerant R, forming the hot temperature source $T_R$ of about 50° C. to 150° C., and the external airflow A, forming the cold temperature source $T_A$ of about −50° C. to −70° C., represented by arrows in FIG. 8. The cooling system 1 then only performs a cooling function of the refrigerant R.

Figure 9:
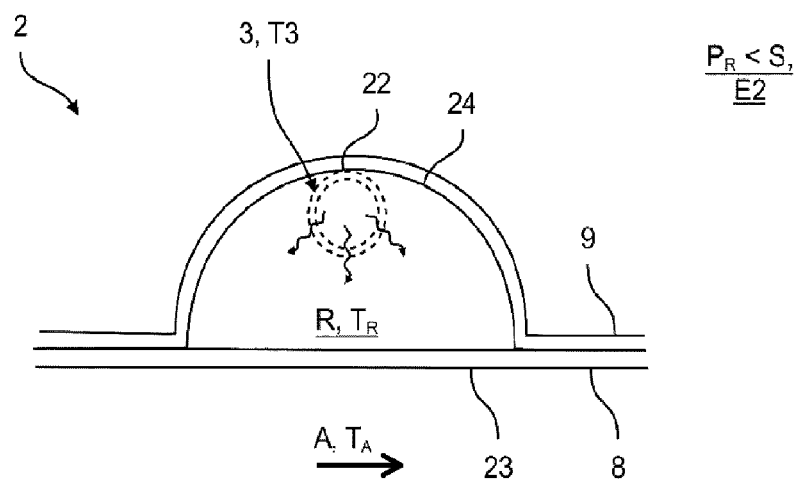
FIG. 9 is a schematic representation of the heat transfers in the cooling system when the safety heating device is activated.

As shown in [FIG. 9], when the physical parameter $P_R$ is below the threshold S, namely when the temperature $T_R$ of the refrigerant fluid R is below the threshold temperature, the safety heating device 3 is activated. In other words, the line 30 is supplied with heat transfer fluid C by opening the valve or the resistive electrical cable 31 is energized. The safety heating device 3 then comprises a temperature T3 between 100 and 200° C., which allows heating the refrigerant R by conduction. Note that the heat exchanges between the refrigerant R and the external airflow A persist, but that they are low given the low temperature $T_R$ of the refrigerant R.

A step of deactivating is then implemented to deactivate the safety heating device 3, preferably when the physical parameter $P_R$ is greater than the threshold S. Preferably, the steps of activating E2 and deactivating are automatically controlled from the physical parameter $P_R$, preferably the temperature $T_R$ of the refrigerant R. Preferably also, the step of measuring E1 the temperature $T_R$ is implemented at least during an engine stop in flight, preferably periodically. In addition, the activation step is preferably implemented for a fixed period at each flight in order to check the proper operation of the system.

The invention also relates to a method of manufacturing the cooling system 1 which comprises a step of attaching the safety heating device 3 to the inner skin 9 and a step of assembling the inner skin 9 and the outer skin 8. The attaching and assembly steps are preferably implemented by welding, in particular by friction welding/mixing, and/or gluing. At the end of the manufacturing process, the safety heating device 3 extends between the inner skin 9 and the outer skin 8.

The invention has previously been described in connection with a refrigerant R in the form of oil that is configured to cool and lubricate the rotating portions of the rotating members of an aircraft propulsion assembly 10. However, the invention applies to a cooling system 1 of any refrigerant R in the aircraft, such as for the conditioning of the area of the aircraft cabin.

The invention claimed is:

1. A cooling system for cooling a refrigerant of an aircraft, the cooling system comprising a plurality of circulation ducts, the circulation ducts being configured to be at least partially in contact with an airflow so as to cool the refrigerant by convection, the cooling system comprises:
    at least one safety heating device extending internally into at least one portion of said circulation ducts so as to directly heat the refrigerant,
    at least one member for measuring a physical parameter of the refrigerant, according to a flow rate of the refrigerant in the circulation ducts, and
    at least one control member configured to activate the at least one safety heating device when the measured physical parameter is less than a predetermined threshold corresponding to a minimum flow rate of the refrigerant in the circulation ducts.

2. The cooling system according to claim 1, wherein the at least one safety heating device extends internally into at least one third of the circulation ducts.

3. The cooling system according to claim 1, wherein at least one portion of the circulation ducts comprises a wall comprising an inner face on which the at least one safety heating device is attached at a plurality of attachment points that are discontinuous from each other.

4. The cooling system according to claim 2, wherein at least one portion of the circulation ducts comprises a wall comprising an inner face on which the at least one safety heating device is attached at a plurality of attachment points that are discontinuous from each other.

5. The cooling system according to claim 1, wherein at least one portion of the circulation ducts comprises a wall comprising an exchange portion in contact with the airflow and an opposite portion to the exchange portion which is isolated from the airflow, the at least one safety heating device being attached to the opposite portion.

6. The cooling system according to claim 1, wherein at least one portion of the at least one safety heating device extends in a wavy manner within at least one circulation channel.

7. The cooling system according to claim 6, wherein the wavy manner is generally helical.

8. The cooling system according to claim 1, further comprising an outer skin in contact with the airflow and an inner skin isolated from the airflow, and wherein the outer skin and the inner skin defining together the circulation ducts.

9. The cooling system of claim 8, wherein the outer skin is smooth.

10. The cooling system according to claim 1, wherein the at least one safety heating device comprises at least one heating line where a heat transfer fluid circulates.

11. The cooling system of claim 10, wherein the heat transfer fluid is air.

12. The cooling system according to claim 1, wherein the at least one safety heating device comprises at least one resistive electrical cable.

13. An aircraft comprising at least one propulsion assembly configured to provide the propulsion thereof and comprising at least one system for cooling a refrigerant according to claim 11, the refrigerant being configured to cool at least one rotating member of the propulsion assembly.

14. A method for using the cooling system according to claim 1, comprising:
    a step of measuring a physical parameter of the refrigerant, which is according to the flow rate of the refrigerant in the circulation ducts, and
    when the measured physical parameter is less than a predetermined threshold corresponding to a minimum flow of the refrigerant in the circulation ducts, a step of activating the at least one safety heating device so as to heat the refrigerant.

* * * * *